Dec. 26, 1961 E. L. McCOLLUM 3,014,688
COMPACT LEAKLESS VALVE
Filed Dec. 2, 1959
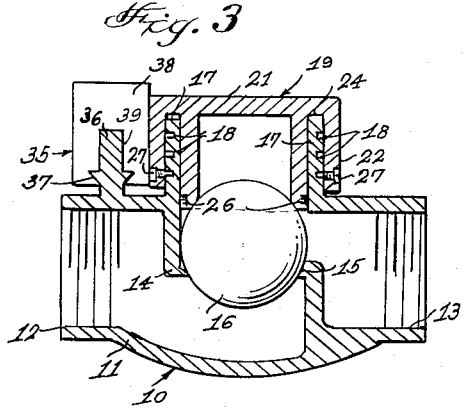
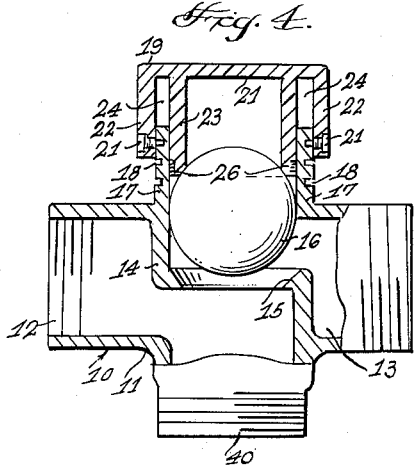
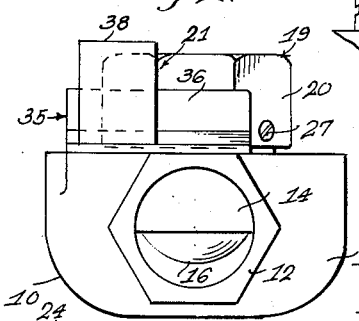
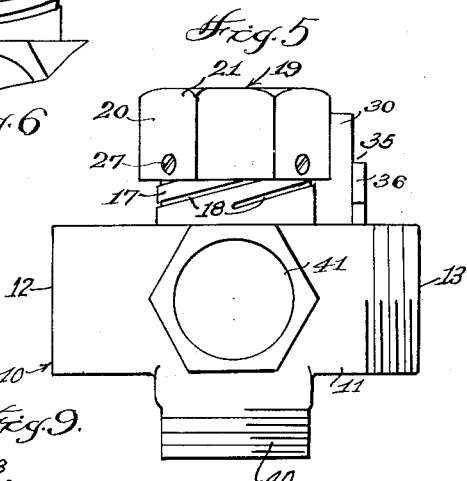
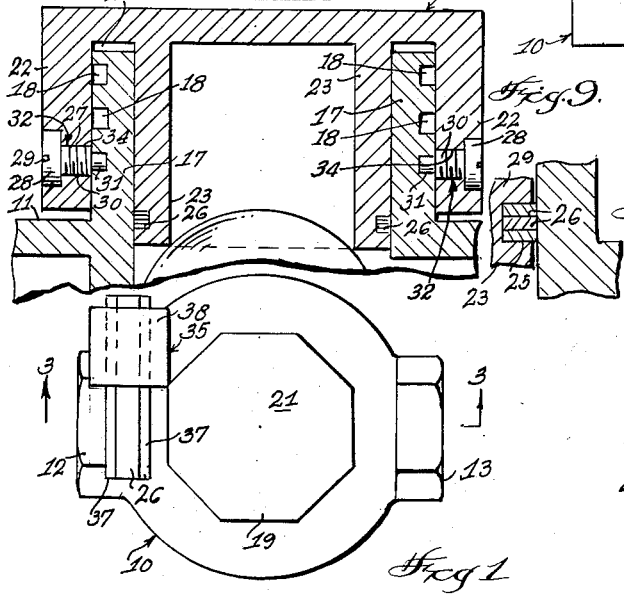
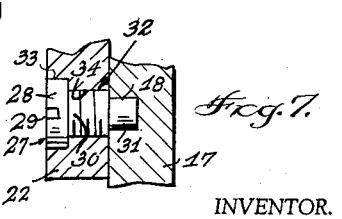
INVENTOR.
EARL LEROY McCOLLUM
BY
Victor J. Evans & Co.
ATTORNEYS

United States Patent Office 3,014,688
Patented Dec. 26, 1961

3,014,688
COMPACT LEAKLESS VALVE
Earl Leroy McCollum, P.O. Box 361, La Puente, Calif.
Filed Dec. 2, 1959, Ser. No. 856,703
3 Claims. (Cl. 251—111)

This invention relates to a valve.

The object of the invention is to provide a valve which includes a ball that is mounted for movement into and out of opened or closed relation with respect to a valve seat.

Another object of the invention is to provide a valve which includes an adjustable cap that can be moved or adjusted in order to regulate the movement of the ball within the valve, and wherein there is also provided a locking means for selectively retaining or maintaining the cap immobile in its various adjusted positions.

A further object of the invention is to provide a compact leakless valve which is extremely simple and inexpensive to manufacture.

Other objects and advantages will be apparent during the course of the following description.

In the accompanying drawings, forming a part of this application, and in which like numerals are used to designate like parts throughout the same:

FIGURE 1 is a plan view of the compact leakless valve of the present invention.

FIGURE 2 is an end elevational view.

FIGURE 3 is a sectional view taken on the line 3—3 of FIGURE 1.

FIGURE 4 is a sectional view similar to FIGURE 3 but showing the ball in a different position and illustrating a modification of the body member.

FIGURE 5 is an elevational view illustrating a further modification.

FIGURE 6 is a fragmentary elevational view showing the collar which has the spiral groove therein.

FIGURE 7 is a fragmentary sectional view showing one of the securing elements.

FIGURE 8 is a fragmentary sectional view illustrating the O rings.

FIGURE 9 is a fragmentary sectional view illustrating certain constructional details of the present invention.

Referring in detail to the drawings, the numeral 10 indicates the compact leakless valve of the present invention which comprises a body member 11 that is provided with an inlet 12 and an outlet 13, FIGURE 3. Arranged within the body member 11 is a partition 14 which is provided with a tapered opening 15 that defines a valve seat, the numeral 16 indicates a hollow ball which is mounted for movement into and out of opened or closed relation with respect to the valve seat 15.

Formed integral with the body member 11 is a cylindrical collar 17 which is provided with a plurality of spiral grooves 18, FIGURE 6.

The valve further includes an adjustable cap 19 which is provided on its outer surface with a plurality of angularly arranged flat faces or surfaces 20, FIGURE 2. The cap 19 further includes an end portion 21 as well as spaced parallel inner and outer sleeves or portions 22 and 23, and these sleeves 22 and 23 define there between a channel 24 for receiving the collar 17. As shown in the drawings the inner sleeve 23 is longer than the outer sleeve 22, and the inner sleeve is adapted to engage the movable ball 16 so that by positioning the cap 19 in a desired location, the inner sleeve 23 will function as a stop member to limit movement of the ball 16 away from the seat 15 whereby the amount of fluid or other material which passes through the opening 15 can be regulated or controlled as desired.

As shown in the drawings there is provided in the outer surface of the sleeve 23 an annular recess or groove 25, and O-rings 26 are seated in the recess 25 and frictionally engage the inner surface of the collar 17 so as to provide a fluid type seal between the moving parts.

There is further provided securing elements 27 which each extend through the outer sleeve 22 and engage the grooves 18 in the collar 17. The securing element 27 comprises an outer enlarged head 28 which is provided with a slot 29 therein for engagement with a suitable tool such as a screw driver, and each securing element 27 further includes a threaded portion 30 as well as a reduced diameter portion 31 which engages the corresponding groove 18. Openings 32 are provided for the securing elements 27, and the openings 32 each comprise an outer countersunk section 33 for receiving the head 28, and there is also provided a threaded section 34 for receiving the threaded portion 30 of the securing element, as for example as shown in FIGURE 7.

The numeral 35 indicates a locking means which is provided for maintaining the cap 19 immobile in its various adjusted positions, and the locking means 35 comprises a guide bar 36 which is formed integral with the body member 11 or secured thereto. The guide bar 36 is provided with diametrically opposed teeth or tongues 37, FIGURE 3, and the numeral 38 indicates a block which is slidably mounted on the bar 36, and the block 38 is provided with a cutout 39 which conforms in configuration to the guide bar 36. When it is desired to adjust or rotate the cap 19 on the collar 17, the block 38 is shifted outward away from the cap, and after the cap 19, has been adjusted to the desired position the block 38 is shifted inwardly so that the side of the block 38 will jam or cam against one of the flat faces 20 of the cap 19 in order to prevent accidental rotation of the cap.

As shown in FIGURES 4 and 5 for example the body member may be provided with other fittings or portions 40 and 41 which can be connected to different types of conduits, pipes or the like as desired.

From the foregoing, it is apparent that there has been provided a valve, and with the parts arranged as shown in the drawings, it will be seen that a suitable medium such as a fluid is adapted to be conveyed from a suitable source of supply or other location to the inlet 12, and with the parts arranged as shown in FIGURE 4 for example the fluid can pass through the opening 15 and out through the outlet 13 to any desired location since the ball 16 is away from the valve seat 15.

The cap 19 in FIGURE 4, is arranged in an outer position as compared to the position of the cap, FIGURE 3, so that the inner end of the sleeve 23 permits the ball 16 to move away from the seat 15. When it is desired to block off flow of fluid through the opening 15, the cap 19 is adjusted inwardly to the position of FIGURE 3 so that the inner end of the sleeve 23 jams against the ball 16 and maintains the ball 16 closed on the tapered valve seat 15 so that no fluid can flow through the valve seat or opening 15.

The cap 19 is shaped to include the sleeves 22 and 23 which define the channel 24 therebetween, and the O-rings 26 which are seated in the recess 25 provide a fluid type seal between the cap and collar 17, regardless of the position of the cap.

The provision of the spiral grooves 18 in the collar 17 as well as the securing elements 27 which have their inner ends 31 engaging the grooves 18 provides a means of setting or adjusting the cap 19 to a plurality of different positions so that the amount of movement of the ball 16 away from the seat 15 can be controlled in order to regulate the flow of fluid through the opening 15.

When the cap 19 is being adjusted, the block 38 is in the position of FIGURE 1 for example so that the cap 19 is free to rotate on the collar 17. After the cap 19 has been adjusted to the desired position, the block 38 is moved inwardly on its guide bar 36 so that a flat face 20 of the cap 19 will be engaged by a side of the block 38 in order to prevent further rotation or movement of the cap 19 so that the cap 19 will be maintained immobile in its desired position.

The parts can be made of any suitable material and in different shapes or sizes.

The valve of the present invention is useful for different purposes and it is attractive and compact and is easy to install and maintain. The valve is constructed so that it will have a minimum amount of height and wherein the valve is of a compact construction and is leakproof. The set screws 27 engage the grooves or tracks 18 so as to permit the necessary turning movement of the cap 19. The cap 19 preferably has a plurality of flat sides 20, and for example it may have eight sides 20 so as to have the shape of an octagon. By positioning the padlock or block 38 at the proper position on the dove tail bar 36, the octagonal shape cap 19 will be kept from turning. The valve of the present invention is especially suitable for use as a plumbing fixture but it can be used wherever desired or required. The valve is extremely compact and highly aesthetic and eliminates much of the maintenance problems that exist in similar valves. The valves shown in FIGURES 4 and 5 may be used as a mixing valve and closures or caps can be arranged on certain of the fittings if they are not needed. The ball 16 is adapted to be made of a suitable material such as brass, bronze or stainless steel and is hollow, and the set screws 27 are of the type which do not work loose or shake loose during use of the valve. The valve is thus highly compact and eliminates the necessity of using packing, since the packing is replaced by the rings 26. The rings 26 may be made of a suitable metal and may resemble piston rings. For example two of the rings may be made of steel and one of the rings may be made of copper. The cap locks in its various adjusted positions by means of the push fit lock 38 which is engaged with the dove tail 36 on the body 11.

Minor changes in shape, size and rearrangement of details coming within the field of invention claimed may be resorted to in actual practice, if desired.

What is claimed is:

1. In a valve, a body member provided with an inlet and outlet, a partition arranged in said body member and said partition being provided with a tapered seat, a ball mounted for movement into and out of closed and opened relation with respect to said seat, a cylindrical collar on said body member provided with a plurality of spaced apart spirally arranged grooves in its exterior, a cap adjustably connected to said collar and said cap including a plurality of angularly arranged flat surfaces, said cap further including an end portion and spaced apart inner and outer sleeves which define there between a channel for receiving said collar, said inner sleeve engaging said ball, there being an annular recess in the outer surface of said inner sleeve, O-rings seated in said recess and engaging said collar, securing elements extending through the outer sleeve of said cap and engaging the grooves in said collar, each of said securing elements comprising an outer head provided with a kerf, each securing element further including a threaded portion and a reduced diameter portion threadedly engaging said groove, there being openings in said outer sleeve for the projection therethrough of said securing elements, each of said openings comprising an outer section for receiving said head, and each opening further including a threaded section for receiving the threaded portion of a securing element.

2. In a valve, a body member provided with an inlet and outlet, a partition arranged in said body member and said partition being provided with a tapered seat, a ball mounted for movement into and out of closed and opened relation with respect to said seat, a cylindrical collar on said body member provided with a plurality of spaced apart spirally arranged grooves in its exterior, a cap adjustably connected to said collar and said cap including a plurality of angularly arranged flat surfaces, said cap further including an end portion and spaced apart inner and outer sleeves which define there between a channel for receiving said collar, said inner sleeve engaging said ball, there being an annular recess in the outer surface of said inner sleeve, O-rings seated in said recess and engaging said collar, securing elements extending through the outer sleeve of said cap and engaging the grooves in said collar, each of said securing elements comprising an outer head provided with a kerf, each securing element further including a threaded portion and a reduced diameter portion threadedly engaging said groove, there being openings in said outer sleeve for the projection therethrough of said securing elements, each of said openings comprising an outer section for receiving said head, and each opening further including a threaded section for receiving the threaded portion of a securing element, said inner sleeve being longer than said outer sleeve.

3. The structure as defined in claim 2 and further including locking means for the cap, said locking means comprising a guide bar on said body member, said guide bar having diametrically opposed pointed tongues, a block slidably mounted on said guide bar and said block having a cutout for snugly receiving said bar and tongues, said cutout conforming in configuration to said guide bar, said guide bar being mounted on said body member in relation to said cap so that one side of said block may coact with the flats on said cap to lock the cap in the desired position.

References Cited in the file of this patent
UNITED STATES PATENTS

| 2,076,839 | Heggem | Apr. 13, 1937 |

FOREIGN PATENTS

| 334,615 | Italy | June 28, 1936 |
| 1,113,983 | France | Dec. 12, 1955 |